United States Patent [19]
Gordy et al.

[11] 3,731,399
[45] May 8, 1973

[54] DEVICE AND METHOD FOR BRIDGE INSTRUCTION

[76] Inventors: Edward L. Gordy; Laura Jane Gordy, both of 424½ Brazilian Avenue, Palm Beach, Fla. 33480

[22] Filed: June 18, 1971

[21] Appl. No.: 154,643

[52] U.S. Cl. .................................35/8 B, 273/152.2
[51] Int. Cl. ..............................................G09b 19/22
[58] Field of Search...................35/8 B; 273/149 P, 273/152.2

[56] References Cited

UNITED STATES PATENTS 3,428,323   2/1969   Fried ................................273/152.2

FOREIGN PATENTS OR APPLICATIONS 535,269   1941   Great Britain ....................273/149 P

*Primary Examiner*—Wm. H. Grieb
*Attorney*—James F. Coffee et al.

[57] ABSTRACT

This disclosure described an instructional device and method for teaching the proper bidding and opening leads in the game of bridge. The device includes a set of four bidding charts, e.g., on separate cards, one for each player. Each bidding chart includes an identification of the playing cards of the bridge hand for the particular player and an identification of the seating position for that player, i.e., north, east, south or west. Each chart also includes a bidding sequence showing the correct sequence of bids for the next preceding bidder. One of the charts, that of a player other than the opening leader, will indicate the correct opening lead against the correct final contract.

In teaching bridge with this device each player is given his bidding chart and the player selects the proper playing cards indicated on his chart for his bridge hand from a deck of playing cards. The players bid their hands in accordance with the normal sequence of bidding used in the game of bridge and if any player makes an incorrect bid, the next succeeding bidder can consult his bid chart and inform the prior bidder whether or not he has made an incorrect bid. The prior bidder can then try again to make the correct bid or eventually be told what the bid should be. Once the bidding is complete, the opening leader selects his lead and if the lead is incorrect he can be corrected by the player on whose chart the opening lead is indicated, usually the declarer.

9 Claims, 1 Drawing Figure

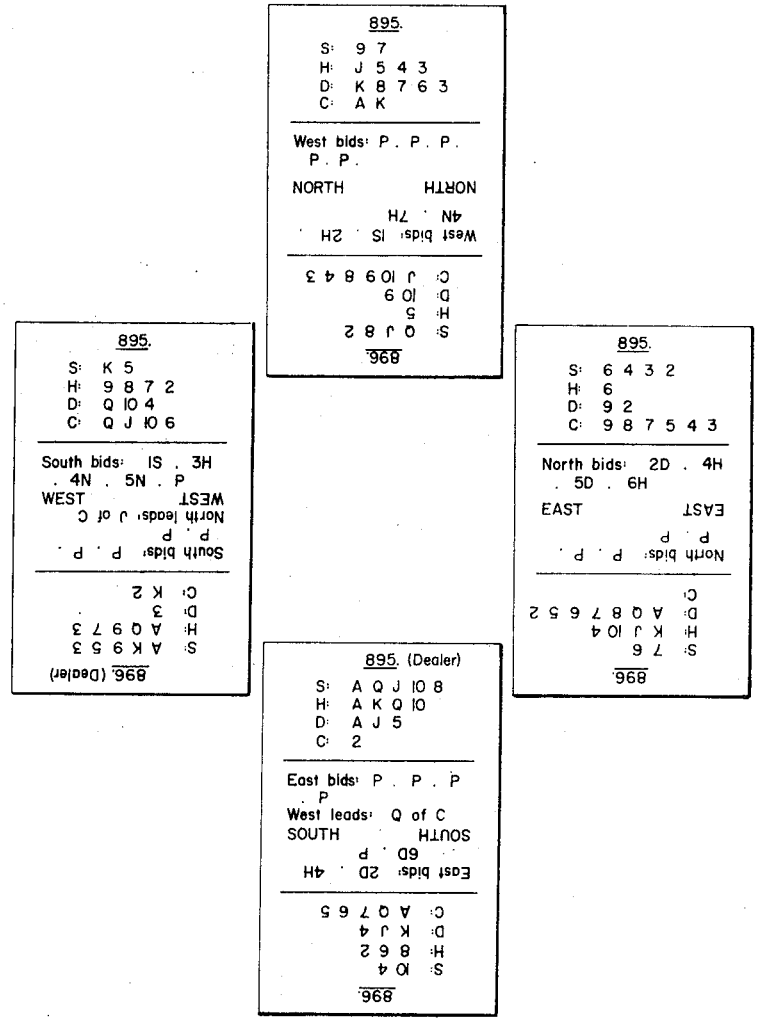

PATENTED MAY 8 1973　　　　　　　　　　　　　　　　　　　　　3,731,399

895.

S: 9 7
H: J 5 4 3
D: K 8 7 6 3
C: A K

West bids: P . P . P . P . P .

NORTH　　　　　　　　NORTH

West bids: 1S . 2H . 4N . 7H

S: Q J 8 2
H: 5
D: J 10 9
C: J 10 9 8 4 3

896.

---

895.

S: K 5
H: 9 8 7 2
D: Q 10 4
C: Q J 10 6

South bids: 1S . 3H . 4N . 5N . P

WEST　　　　　　　　WEST

North leads: J of C

South bids: P . P . P . P

S: A K 9 5 3
H: A Q 9 7 3
D: 3
C: K 2

896. (Dealer)

---

895.

S: 6 4 3 2
H: 6
D: 9 2
C: 9 8 7 5 4 3

North bids: 2D . 4H . 5D . 6H

EAST　　　　　　　　EAST

North bids: P . P

S: 7 6
H: K J 10 4
D: A Q 8 7 6 5 2
C:

896.

---

895. (Dealer)

S: A Q J 10 8
H: A K Q 10
D: A J 5
C: 2

East bids: P . P . P . P

West leads: Q of C

SOUTH　　　　　　　　SOUTH

East bids: 2D . 4H . 6D . P

S: 10 4
H: 8 6 2
D: K J 4
C: A Q 7 6 5

896.

DEVICE AND METHOD FOR BRIDGE INSTRUCTION

BACKGROUND OF THE INVENTION

1. Field of the Invention

This invention relates to a method and device for the instruction of correct bidding and play of the game of bridge.

2. Brief Description of the Prior Art

One of the most common instructional aids for teaching bridge is the "bridge column" which appears daily in almost every major newspaper in the country. The bridge column usually consists of a representation of all players' hands, followed by a bidding sequence and a discussion of the bidding and/or play of the hand. While the bridge column is useful and often entertaining, it has its drawbacks when used as a reference for teaching during practice play of a bridge hand. The bridge hand, the proper bidding and the play of the hand are all exposed for every one to see creating a situation significantly different from the actual game of bridge.

Other devices have been proposed for use during practice play of bridge hands. For example, teaching aids have utilized concealed bids which are later revealed by moving a slide or the like. Other teaching methods involve the use of individual instruction sheets to be looked at after each bid has been made. Another method utilizes free bidding, later corrected by a teacher or by examination of a book after all the bidding has been completed. Some teaching methods involve the use of hand charts, one for each player showing the cards the player should have. However, such devices and/or methods are usually cumbersome, expensive, and/or lack in instructional value.

SUMMARY OF THE INVENTION

The present invention involves the use of bridge players' charts. Each player's chart contains the identification of the cards of his own hand, visible only to him. Each player's chart also has the proper bidding sequence for another player, preferably the player immediately preceding him in the bidding sequence. In this way, if a player makes an incorrect bid, he can be so informed or can be corrected by the next subsequent player before the next subsequent player bids. In a preferred form, one of the charts other than that of the opening leader, e. g., that of the declarer, identifies the correct opening lead to be made against the final contract. Thus if the opening leader makes a mistake, he also can try again or eventually be corrected. Also, every player's bid can thereby be based on a correct sequence of prior bids.

While this invention is susceptible of embodiment in many different forms, there will be described herein in detail various forms of the invention with the understanding that the present disclosure is to be considered as an exemplification of the principles of the invention and is not intended to limit the invention to the forms described.

BRIEF DESCRIPTION OF THE DRAWINGS

The FIGURE shows one form of the present invention.

DESCRIPTION OF THE PREFERRED EMBODIMENTS

For each bridge hand, there are provided four bridge hand and bidding charts, one for each bridge player. The charts can conveniently be in the form of a small hand card, or sheets of paper, or even a book form can be used. A separate set of hand cards can be used for each bridge hand or for two or more hands can be printed in separate positions on a single set of hand cards, e. g., inverted or on the reverse sides of the hand cards. The drawing shows an example of four such hand cards on which are printed identifications or representations of two separate bridge hands for the four players.

The two bridge hands on the above hand cards are identified as numbers 895 and 896. The bidding chart for bridge hand number 895 is represented in the top half of each hand card while the bidding chart for bridge hand number 896 is represented in the lower half and inverted. The hand cards can be conveniently kept in appropriately sized pockets provided on the skirt portion of a bridge table cover, protruding from the top of the pockets, so that the bidding chart for one hand is viewable by the respective player but not by any other player. By simply removing the hand card, inverting it and reinserting it in the pocket, bridge hand number 896 can be made visible above the lip of the pocket in lieu of bridge hand number 895.

Considering the bidding charts and referring to hand number 895, it will be noted that the playing cards for each player's hand are identified on the respective player's chart. The four players are identified as "North", "East", "South" and "West" in the normal nomenclature used with respect to bridge players. The chart informs the player which cards of each suit he is supposed to have in his hand. In hand number 895, South is identified as the declarer so South will start the bidding. South's correct bids are not indicated on his own chart but, rather, are indicated on West's chart. Similarly, West's correct bids are indicated on North's chart, North's on East's chart and East's on South's chart so that each bidder can correct the next previous bid before he himself bids.

Each student player selects his playing cards as identified on his chart, preferably from his own private deck of cards which has a reverse side design different from that of each other player's. The players make up their hands and South begins the bidding. As indicated on the cards for hand number 895, South's correct initial action is to open the bidding with a bid of one spade. See West's card. If he does not do so, West can tell South that he has made a bidding error and South can try again. Eventually, West may have to tell South what his bid should have been. The opportunity to try again is believed to be unique to the present method and device. Prior systems involving the exposure of a card or the like when an error is made can only reveal the correct bid and cannot give the student the additional challenge of correcting his own errors.

In accordance with the bidding sequence shown on the charts for hand 895, after South opens the bidding at one spade, the bidding should proceed as follows:

| WEST | NORTH | EAST | SOUTH |
|---|---|---|---|
| Pass | 2 Diamonds | Pass | 3 Hearts |
| Pass | 4 Hearts | Pass | 4 No Trump |

| Pass | 5 Diamonds | Pass | 5 No Trump |
| Pass | 6 Hearts | Pass | Pass |
| Pass | | | |

Thus North and South reach a contract of six hearts by the above bidding sequence. If any errors are made during the bidding, the next bidder can alert the previous bidder to the fact of an error or eventually correct it. South is the declarer of the six heart contract and West is on lead against the contract. As indicated on South's chart, West's proper lead is the queen of clubs and if West makes any other lead, South is in a position to inform him he has made an incorrect lead. West may then try again or eventually be informed of the correct lead. The play then continues in the manner normal in rubber bridge. Cards are played into the center of the table, and tricks are collected by the winning side. It is not necessary to play "duplicate-fashion." After the play is over, each player retrieves his cards, which he can recognize by the distinctive backs. He then resorts his cards into suits and places them in front of him, faced toward the other players. Everyone at the table can now review and discuss the entire four hands with respect to both the bidding and the play. Although an instructor can be present, this is really not necessary for obtaining benefit from the present device. Alternatively, a discussion of the hand can be printed on the reverse side of the card, including any unusual bidding technique or playing technique involved in the hand, or the discussion can be left to the students themselves. When the discussion has been completed, each player re-sorts his cards to his original deck and then selects the cards from his deck for the next hand.

Simply by inverting the hand cards, the four students can refer to hand number 896 and sort from their decks the correct cards for that hand. The bidding sequence is again shown on the bidding charts and as will be seen, West is dealer and his first action is to open the bidding at one spade. Through the bidding sequence shown, East and West arrive at a contract of seven hearts with West as the declarer. North is on lead against the contract and, as seen from West's card, North's proper lead is the jack of clubs. Any other lead will be corrected by West. As before, the hand is played and the cards are retrieved. A discussion can follow.

It will be evident that a multitude of sets of bidding charts can be provided identifying hundreds of different bridge hands with correct bidding sequences and opening leads. The charts can be used to great advantage especially because any wrong action such as a wrong bid or wrong lead can be corrected immediately and does not throw off subsequent bidding or playing sequences. Further, the student, knowing that the preceding bid is correct, in considering his own bid can think about the kind of hand that would be needed to make such a bid with resulting improvement in his knowledge of the game. Students can also rely on the bids as being correct in their play of the game. The device has a highly beneficial effect of increasing involvement by all of the participants with very desirable results. Each student is placed in a position of authority at some time during the bidding of the hand and for a moment he is the wise player at the table. The consequent feeling of wisdom and authority increases the student's enjoyment in learning and his involvement increases his interest and, as a result, the amount he learns. Further, during play of the hand the declarer plays the hand under the most normal conditions possible.

Still another advantage of the present device accrues in classes where students at more than one bridge table are instructed by a common teacher. Each table is autonomous. The students at each table can complete their bidding and play without having to wait for other tables. Thus they have more time to study the hand afterwards. They can use any remaining spare time to study pertinent items in a text book or lesson sheet which can accompany the bidding charts.

We claim:

1. A device for instruction of bidding in the game of bridge comprising a set of four separate charts, one for each player including means identifying the cards of each player's bridge hand on his respective chart different from each other player's bridge hand, means on each chart identifying the table seating position for the respective player and means on each player's chart identifying the correct bid or bids for another player and not his own.

2. The device of claim 1 wherein said correct bid identifying means comprises means on each player's chart identifying the correct bid or bids for the next preceding player in order of bidding, i.e., the South player's chart identifies the East player's bids, the East player's chart identifies the North player's bids, the North player's chart identifies the West player's bids and the West player's chart identifies the South player's bids.

3. The device of claim 1 including means on one of the player's charts identifying that player as dealer and differentiating the dealer from all other players.

4. The device of claim 1 including means on at least one player's chart who is not the opening leader identifying the correct opening lead.

5. The device of claim 4 wherein the opening lead identification is on the declarer's chart.

6. The device of claim 1 including a plurality of sets of said charts, each set identifying a different bridge hand.

7. A device for instruction of bidding and play in the game of bridge comprising a set of four hand and bidding charts, one for each player, including means identifying the cards of each player's bridge hand on his respective chart, means on each chart identifying the table seating position for the respective player, means on each player's chart identifying the correct bid or bids for another player and not his own, and means on one of the charts other than that of the opening leader identifying the proper opening lead.

8. A device for instruction of bidding and play in the game of bridge comprising a set of four hand and bidding charts, one for each player, means identifying the cards of each player's bridge hand on his respective chart, means on each chart identifying the table seating position as "North", "South", "East" or "West" for the respective player, means on the four charts identifying one of the players as dealer, and differentiating the dealer from all other players, means on one of the charts, not the opening leader's chart, identifying the proper opening lead, means on South's chart identifying East's proper bids, and no other player's, means on East's chart identifying North's proper bids, and no other player's, means on North's chart identifying West's proper bids and no other player's and means on West's chart identifying South's proper bids and no other player's.

9. A method for instruction of bidding and play in the game of bridge comprising (1) providing a set of four hand and bidding charts, one for each player, with means identifying the cards of each player's bridge hand on his respective chart, means on each player's chart identifying the correct bid for another player and not his own and means on at least one chart other than the opening leader identifying the proper opening lead for the hand; (2) selecting hands from a deck of cards for each player as identified on the charts; (3) determining a dealer for the hand; (4) bidding the hand and having each bid corrected by a player who did not make the bid in accordance with the identified correct bids on the charts; (5) having the opening leader select his opening lead; and (6) having the player on whose chart the correct opening lead is identified, correct any error in said opening lead with reference to the proper opening lead on his chart.

* * * * *